US008838480B2

(12) United States Patent
Damola et al.

(10) Patent No.: US 8,838,480 B2
(45) Date of Patent: Sep. 16, 2014

(54) METHOD AND APPARATUS FOR DISPLAY OF OPERATOR ADS

(75) Inventors: Ayodele Damola, Solna (SE); Krister Svanbro, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 34 days.

(21) Appl. No.: 13/246,551

(22) Filed: Sep. 27, 2011

(65) Prior Publication Data

US 2012/0290411 A1 Nov. 15, 2012

Related U.S. Application Data

(60) Provisional application No. 61/483,876, filed on May 9, 2011.

(51) Int. Cl.
*G06Q 30/02* (2012.01)
(52) U.S. Cl.
CPC .................................... *G06Q 30/02* (2013.01)
USPC ........ 705/14.73; 370/252; 370/254; 370/420; 370/421
(58) Field of Classification Search
USPC ................ 705/14.73; 370/252, 254, 420, 421
See application file for complete search history.

(56) References Cited

U.S. PATENT DOCUMENTS

| 6,314,451 | B1 * | 11/2001 | Landsman et al. ............ 709/203 |
|---|---|---|---|
| 6,892,226 | B1 | 5/2005 | Tso et al. |
| 7,860,948 | B2 * | 12/2010 | Hundscheidt et al. ........ 709/219 |
| 8,111,630 | B2 * | 2/2012 | Kovvali et al. ................ 370/252 |
| 2002/0165773 | A1 | 11/2002 | Natsuno et al. |
| 2004/0003117 | A1 * | 1/2004 | McCoy et al. ................. 709/246 |
| 2008/0195664 | A1 * | 8/2008 | Maharajh et al. ........... 707/104.1 |
| 2008/0294998 | A1 * | 11/2008 | Pyhalammi et al. ........... 715/748 |
| 2009/0316715 | A1 * | 12/2009 | Saniee ............................ 370/429 |
| 2010/0174607 | A1 | 7/2010 | Henkin et al. |
| 2011/0112906 | A1 * | 5/2011 | Pulijala et al. ............. 705/14.64 |
| 2012/0272266 | A1 * | 10/2012 | Ou et al. .......................... 725/34 |

FOREIGN PATENT DOCUMENTS

WO 2012052064 A1 4/2012

OTHER PUBLICATIONS

Akamai Ads, Ads for Advertisers, "Connect your products and services to a buying audience"; Mar. 2009; pp. 1-2; http://web.archive.org/web/20101225053135/http://www.akamai.com; Internet Archive Waybackmachine; accessed Oct. 18, 2013.

(Continued)

*Primary Examiner* — John G Weiss
*Assistant Examiner* — Dipen Patel
(74) *Attorney, Agent, or Firm* — Coats & Bennett, P.L.L.C.

(57) ABSTRACT

A method and apparatus for delivering network operator advertisements to a mobile terminal in association with providing content from a content delivery network (CDN) are disclosed. A network node resides within a wireless communication network supporting the mobile terminal. The network node receives a content request directed to locally-cached content from the CDN, and determines that the requested content includes or is associated with an advertisement placeholder. In response to this determination, the network node sends an advertisement ID request that includes a network operator ID to an external advertisement server. An advertisement ID is received from the advertisement server responsive to the advertisement ID request. The network node maps the advertisement ID to a network operator advertisement associated with the advertisement ID, and dynamically links the network operator advertisement to the requested content. The network node delivers the requested content, including the network operator advertisement, to the mobile terminal.

16 Claims, 7 Drawing Sheets

(56) References Cited

OTHER PUBLICATIONS

Limelight Ads, "Vide and audio ads made easy"; Limelight Networks; Jan. 2010, p. 1; http://web.archive.org/web/20110401111726/http://www.limelightnetworks; Internet Archive Waybackmachine; accessed Oct. 8, 2013.

* cited by examiner

| TAC | MANUFACTURER | MODEL |
|---|---|---|
| 35945101 | Sony Ericsson | K810i |
| 35945701 | Sony Ericsson | W810a |
| 35950201 | Sony Ericsson | W960i |
| 35958401 | Sony Ericsson | W660i |
| 35959300 | Sony Ericsson | P990i |
| 35967200 | Sony Ericsson | K750c |

*FIG. 5*

METHOD AND APPARATUS FOR DISPLAY OF OPERATOR ADS

RELATED APPLICATION

This application claims the benefit of U.S. Provisional Patent Application 61/483,876 filed May 9, 2011, which is incorporated herein by reference.

TECHNICAL FIELD

The present invention generally relates to delivering advertisements to mobile terminals, and more particularly relates to delivering network operator advertisements to mobile terminals based on received requests for content from a content delivery network (CDN).

BACKGROUND

CDNs have been used to deliver content, such as multimedia content (e.g. video, audio, etc.) and general web page content (e.g. images, text, etc.), from content providers to large numbers of end users. Some example CDNs include Akamai and Limelight Networks. Content providers employ CDNs because of the reliability, speed and efficiency that the CDNs can offer. For example, CDNs may utilize regional servers throughout the world for caching CDN content, thus reducing the latency of content delivery that would otherwise occur absent such regional servers.

With the advent of smartphones and mobile phone applications, the demand for the delivery of CDN content to mobile devices continues to grow, and the amount of bandwidth utilized by CDNs within wireless communication networks also continues to grow.

SUMMARY

A disclosed method delivers network operator advertisements to a mobile terminal in association with providing requested content from a CDN, and is implemented in a network node within a wireless communication network supporting said mobile terminal. A content request directed to locally-cached content from the CDN is received. The network node determines that the requested content includes or is associated with an advertisement placeholder and in response thereto sends an advertisement identification (ID) request to an external advertisement server. The advertisement ID request includes a network operator ID. An advertisement ID is received from the advertisement server responsive to the advertisement ID request. The advertisement ID is mapped to a network operator advertisement associated with the advertisement ID. The network operator advertisement is dynamically linked to the requested content, and the requested content, including the network operator advertisement, is delivered to the mobile terminal.

A corresponding network node is configured to deliver network operator advertisements to a mobile terminal in association with providing requested content from a CDN, and is configured to deliver the network operator advertisements and requested content via a wireless communication network supporting the mobile terminal. The network node includes one or more communication interfaces for communicating with an external advertisement server included in the CDN, and a controller operatively associated with the one or more communication interfaces. The controller is configured to perform the following steps: receive a content request directed to content from the CDN that is stored in a local cache associated with the network node; determine that the requested content includes or is associated with an advertisement placeholder and in response thereto to send an advertisement ID request to the advertisement server, the advertisement ID request including a network operator ID; receive an advertisement ID from the advertisement server responsive to said advertisement ID request; map the advertisement ID to a network operator advertisement associated with said advertisement ID; dynamically link the network operator advertisement to the requested content; and deliver the requested content, including said network operator advertisement, to the mobile terminal.

In one or more embodiments, the requested content includes a web page, and the network node dynamically links the network operator advertisement to the requested content by updating a uniform resource locator (URL) of the advertisement placeholder to link to the network operator advertisement in the local cache.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 illustrates a plurality of example Type Allocation Code (TAC) values that may be used to identify a mobile terminal device type.

DETAILED DESCRIPTION

Figure 1:
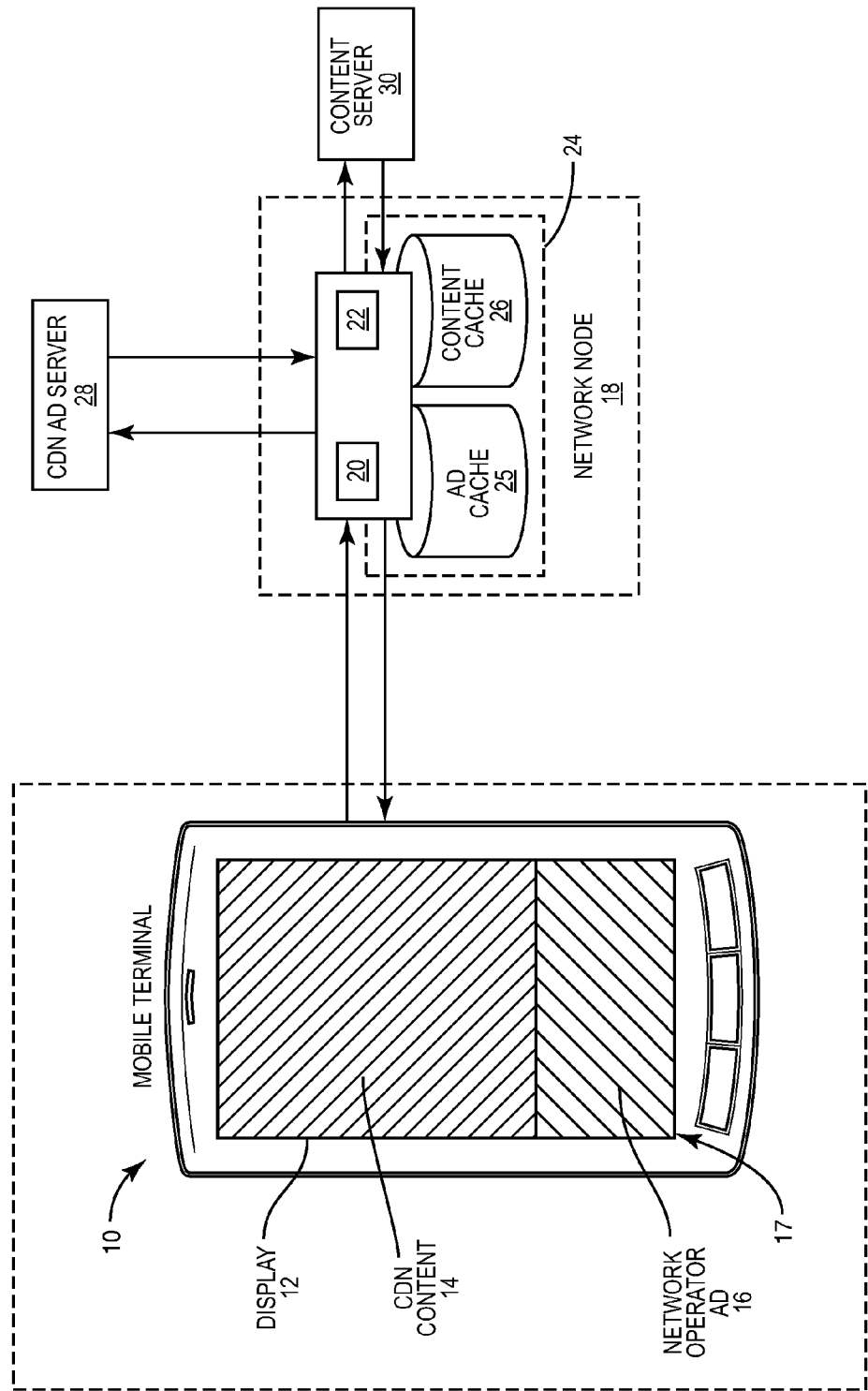
FIG. 1 illustrates an advertisement delivery arrangement between a network node and a mobile terminal.

FIG. 1 illustrates an advertisement delivery arrangement between a network node 18 and a mobile terminal 10. As will be described below in greater detail, the network node 18 is configured to deliver network operator advertisements 16 to the mobile terminal 10 in association with providing requested content 14 from a CDN 32.

Figure 1A:
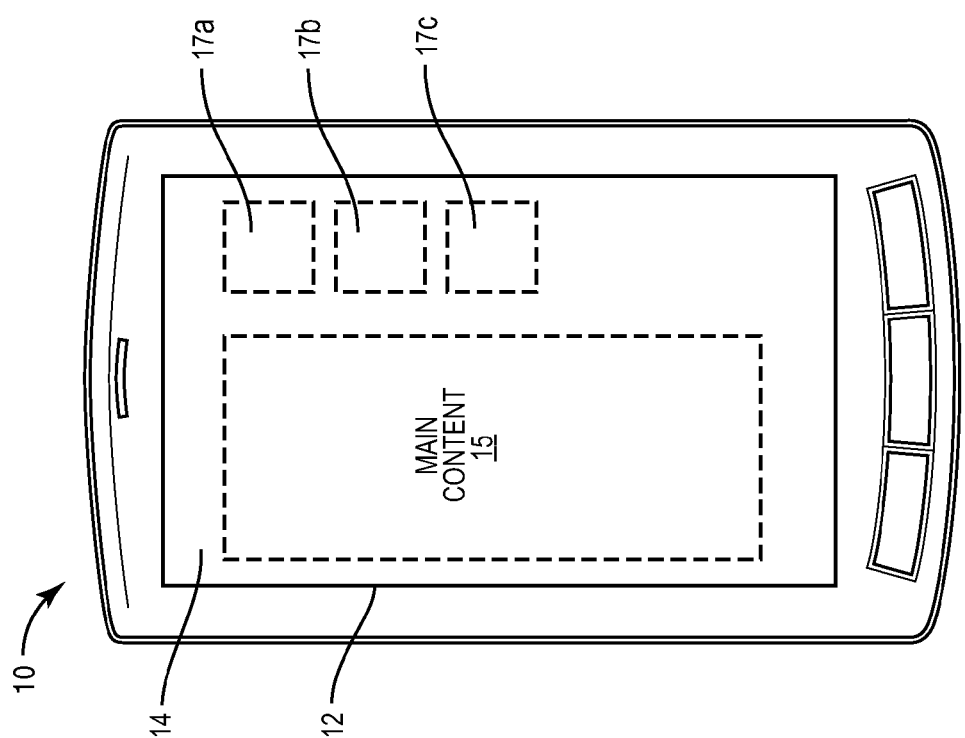

The mobile terminal 10 includes a display 12 for displaying both requested CDN content 14 and also advertisements, such as one or more network operator advertisements 16 relating to a network operator 90 operating a wireless communication network 42 used by the mobile terminal 10. The CDN content 14 and advertisement 16 are delivered from a local cache 24 associated with the network node 18. The local cache 24 includes an advertisement cache 25 and a content cache 26. The network node stores advertisements received from a CDN advertisement server 28 in the advertisement cache 25, and stores CDN content received from one or more CDN content servers 30 in the content cache 26. Both the advertisement server 28 and the one or more content servers 30 are external to the network node 18. The CDN content 14 includes at least one advertising inventory object 17 that acts as an advertisement placeholder for advertisements from the advertisement server 28 (e.g. network operator advertisements). As shown in the example of FIG. 1a, the requested content 14 may include a web page having a main content portion 15 and a plurality of advertisement inventory objects 17*a*-*c*.

The network node 18 includes one or more communication interfaces 20, and a controller 22. The one or more communication interfaces 20 are configured for communicating with the advertisement server 28. The controller 22 is operatively associated with the one or more communication interfaces 20, and is configured to process received content requests and to deliver requested CDN content and associated advertisements to the mobile terminal 10. As a non-limiting example, the controller 22 of the network node 18 may include one or more microprocessor circuits, digital signal processors (DSPs), or other such digital processing circuitry, and may include fixed (dedicated) hardware circuits, programmable circuits, or a mix of both. The local cache 24 may include any type of computer-readable storage (e.g. optical media, flash memory, a hard disc, etc.).

Figure 2:
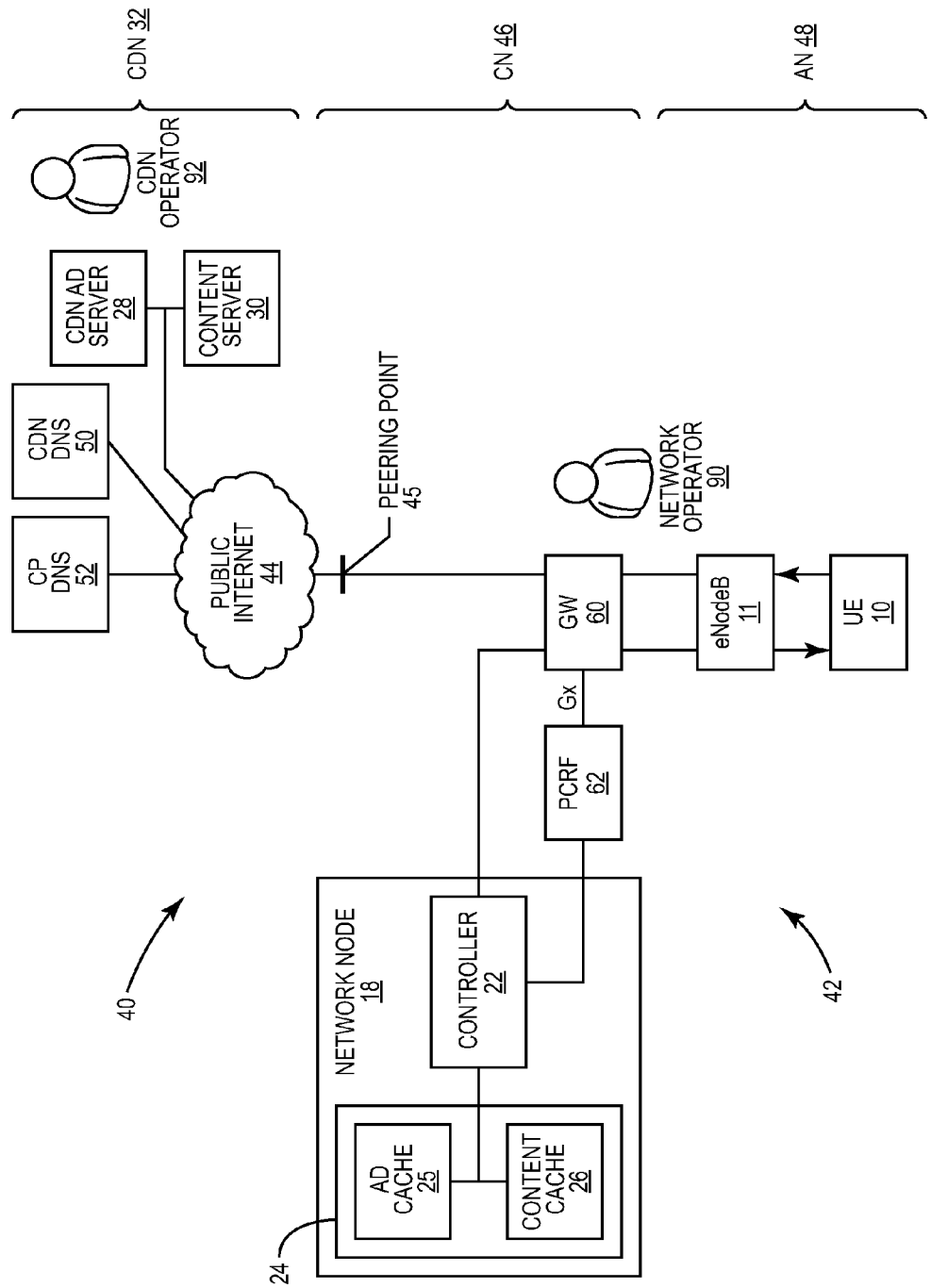
FIG. 2 is a block diagram illustrating a system for delivering advertisements to a mobile terminal in association with providing requested content from a CDN.

FIG. 2 is a block diagram illustrating a system 40 for delivering advertisements to the mobile terminal 10. As shown in FIG. 2, a wireless communication network 42 is in communication with the CDN 32 via a wide area network (WAN) 44, such as the Internet. A peering point 45 (or "GI-UP") acts as a boundary between the core network 46 and the CDN 32. The content delivery network 32 includes the advertisement server 28, the content server 30, a CDN Domain Name System (DNS) server 50, and a content provider DNS server 52.

The wireless communication network 42 includes a core network 46 and an access network 48. As shown in FIG. 2, the network node 18 resides within the core network 46. The access network 48 includes the mobile terminal 10 (shown as "UE" in FIG. 2) and at least one base station 11 (shown as "eNodeB" in FIG. 2). Although shown as a UE in FIG. 2, the mobile terminal 10 should be construed broadly to include without limitation cellular radio telephones, smartphones, PDAs, computers, modems and essentially any other wireless communication device. A gateway 60 connects the base station 11 to the WAN 44. A Policy Charging and Rules Function (PCRF) server 62 may reside between the network node 18 and the gateway 60 in the wireless communication network 42, and may be used to perform various policy and quality of service functions.

Figure 3:
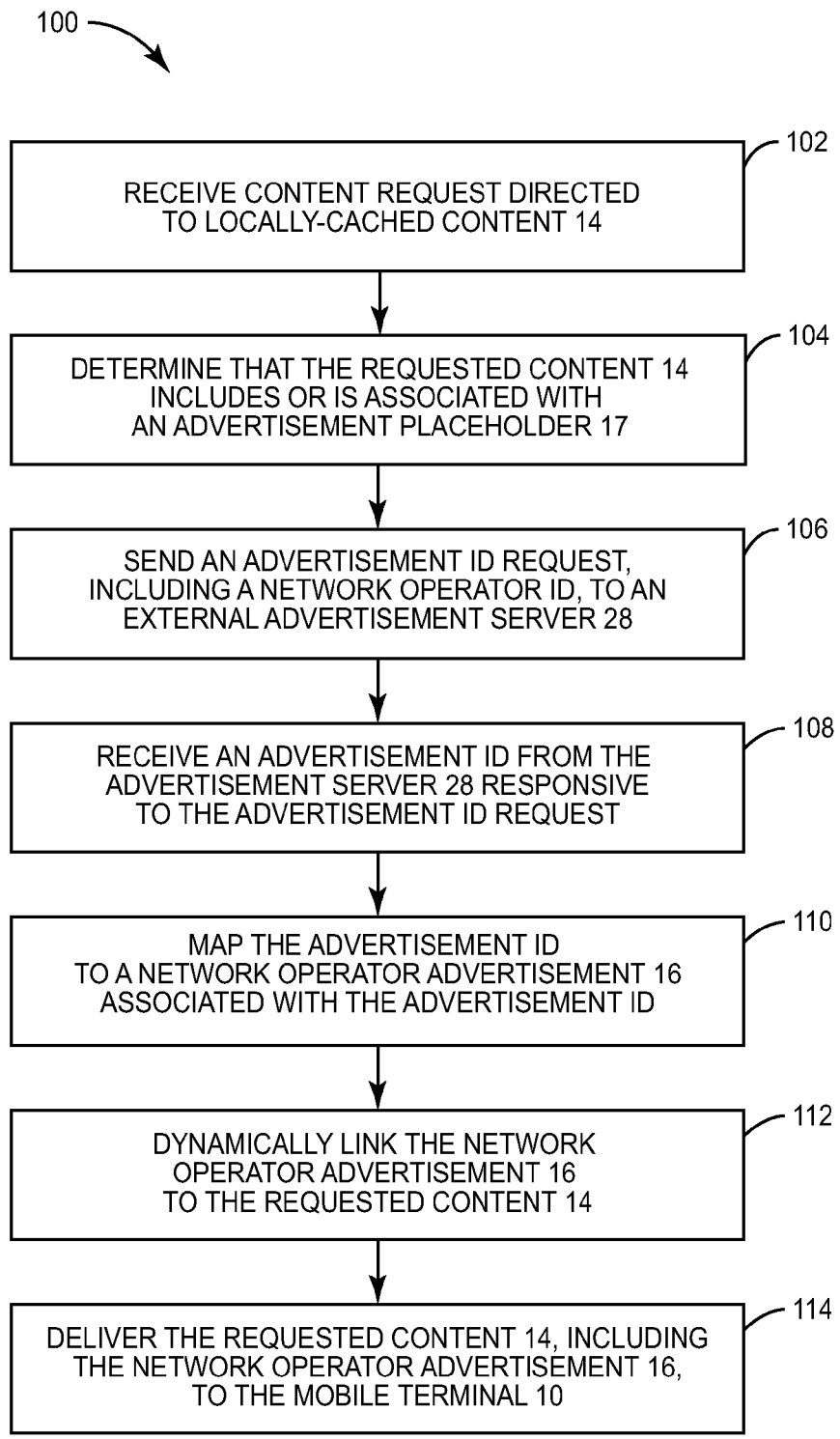
FIG. 3 is a flow chart illustrating a method of delivering network operator advertisements to a mobile terminal.

FIG. 3 is a flow chart illustrating a method 100 of delivering network operator advertisements 16 to the mobile terminal 10 in association with providing requested content 14 from the CDN 32. The method is implemented in the network node 18 within the wireless communication network 42 that supports the mobile terminal 10.

In the method 100, the network node 18 receives a content request directed to locally-cached content 14 from the CDN (step 102). That is, the request is directed to content from the CDN that is stored in the content cache 26 of the local cache 24. The network node determines that the requested content 14 includes or is associated with an advertisement placeholder (e.g. the advertising inventory object 17) (step 104), and in response thereto sends an advertisement ID request to the advertisement server 28 (step 106). The advertisement ID request includes at least a network operator ID identifying the network operator 90.

Responsive to the advertisement ID request, the network node 18 receives an advertisement ID from the advertisement server 28 (step 108). The network node 18 maps the received advertisement ID to a network operator advertisement 16 associated with the advertisement ID (step 110), and dynamically links the network operator advertisement 16 to the requested content 14 (step 112). The network node 18 then delivers the requested content 14, including the network operator advertisement 16, to the mobile terminal 10.

The network node 18 delivers the identified network operator advertisement 16, the requested content 14, or both from the local cache 24. As will be described below in greater detail below, the requested content 14 may include a web page, and the dynamic linking of step 112 may include updating an advertisement inventory object URL of the web page to link to the network operator advertisement in the local cache 24.

Figure 4A:
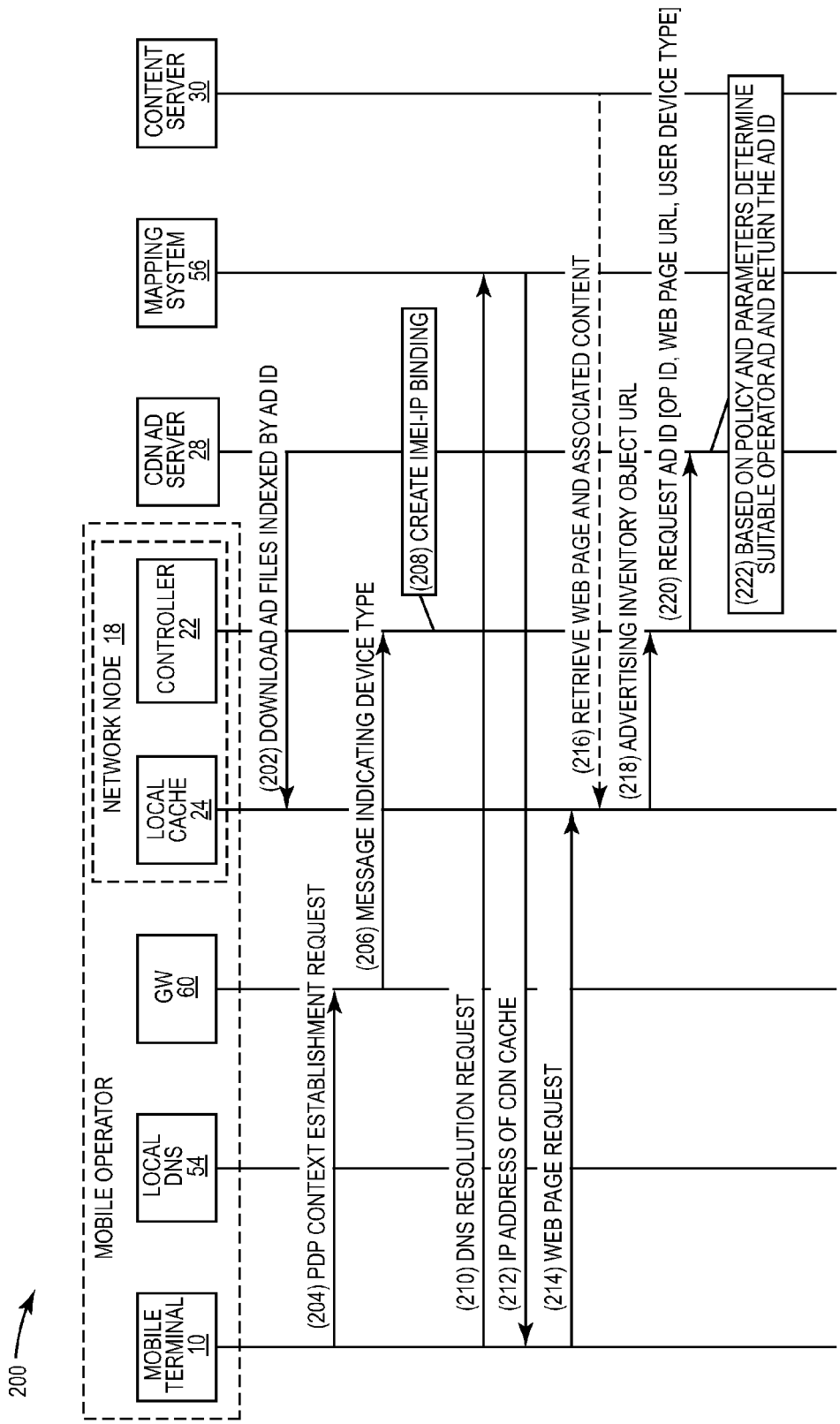
FIGS. 4a-b show a call flow diagram illustrating signaling associated with the method of FIG. 3.
Figure 4B:
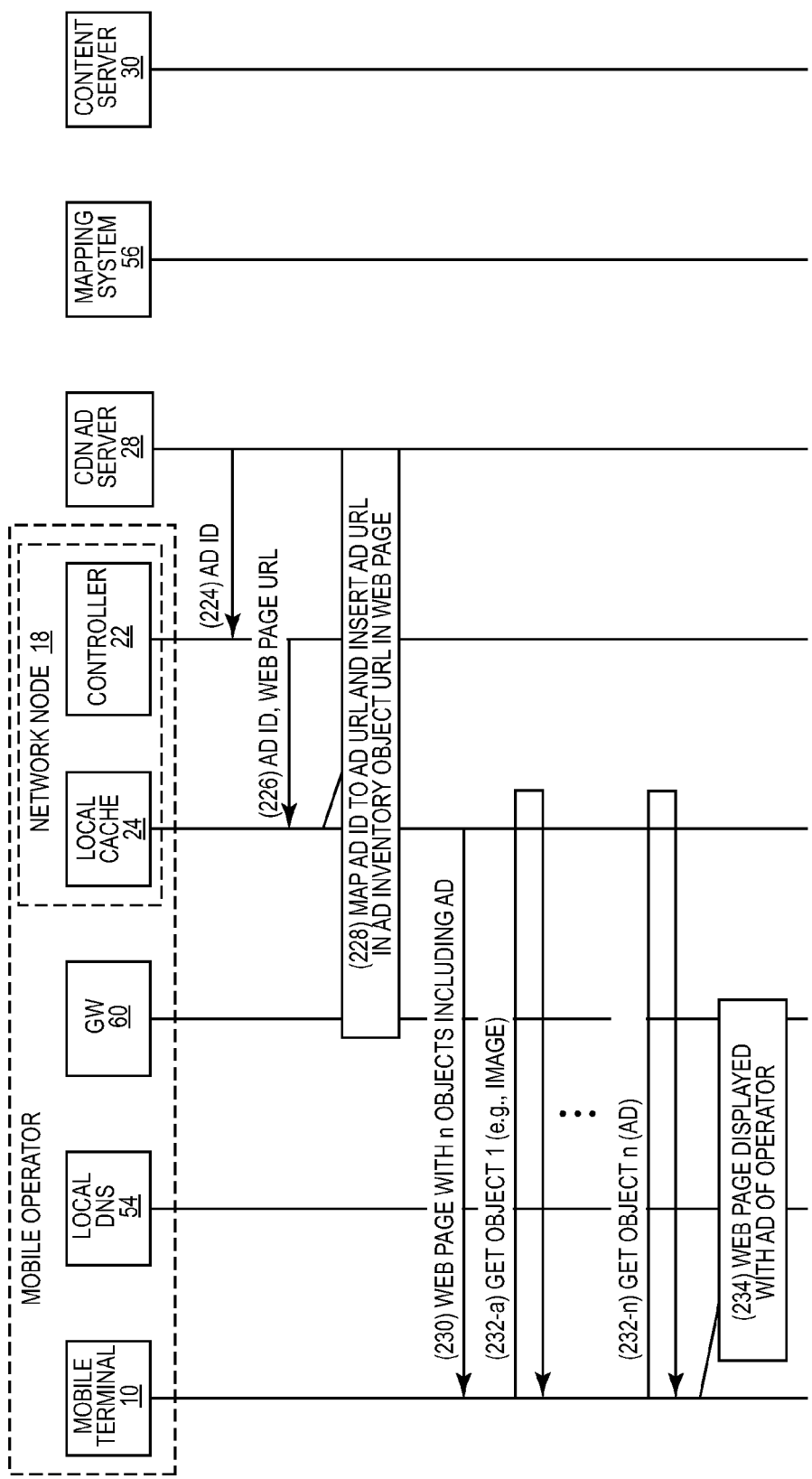

FIGS. 4*a*-*b* show a call flow diagram 200 illustrating signaling associated with the method 100 of FIG. 3 as applied to CDN web page content. As shown in FIG. 4*a*, a plurality of advertisement files is downloaded into the local cache 24 and is indexed by advertisement ID (step 202). The advertisement files may be downloaded, for example, into the advertisement cache 25 portion of the local cache 24. The downloaded advertisements include network operator ads, but may also include non-network operator ads.

Before or after step 202, the network node 18 determines a device type of the mobile terminal 10 based on an International Mobile Equipment Identify (IMEI) of the mobile terminal 10. The IMEI is received from an entity in the wireless communication network 42, such as the gateway 60. In one example, a Packet Data Protocol (PDP) context establishment request is transmitted from the mobile terminal 10 to the gateway 60 (step 204) seeking attachment of the mobile terminal 10 to the wireless communications network 42. Responsive to receiving the request of step 204, the gateway 60 transmits a message identifying the mobile terminal 10 device type to the controller 22 (step 206). The message from the gateway 60 may be a Remote Authentication Dial In User Service (RADIUS) message that includes the IMEI of the mobile terminal 10. In the same or another example, the message from the gateway 60 may include a user telephone number, or a combination of telephone number and IP address.

The IMEI consists of 3 parts: a Type Allocation Code (TAC), a Serial Number (SN), and a Software Version Number (SVN). The TAC may be used to identify the device type. See, for example, FIG. 5 which identifies a plurality of Sony Ericsson mobile phones based upon TAC. Once the controller 22 receives the device type message of step 206, the controller 22 binds the IP address of the mobile terminal 10 to the mobile terminal 10 device type (step 208) for later use in step 220.

A DNS resolution request is received from the mobile terminal 10 (step 210) in which the mobile terminal 10 is requesting an Internet Protocol (IP) address of a content source in the CDN 32. To use the example of a website, the DNS request may ask for the IP address of EBAY.com. The DNS request is sent to mapping system 56, which includes CDN DNS server 50, and may optionally also include content provider (CP) DNS server 52. To use the EBAY.com example, the request of step 204 may be directed to EBAY's DNS server (CP DNS server 52). If EBAY has an agreement with the CDN 32, then the CP DNS server 52 will in turn transmit the DNS resolution request to the CDN DNS server 50. Thus, the CP DNS server 52 may simply redirect the request of step 212 to the CDN DNS server 50. In one example, a network operator DNS server 54 ("local DNS" in FIG. 4) initially receives the DNS resolution request of step 210, and in turn sends that request to the mapping system 56.

The mapping system 56 indicates the IP address of the CDN 32 as being an IP address of the local cache 24 (step 212), effectively redirecting the mobile terminal 10 from its requested content provider to the local cache 24. Thus, if the mobile terminal 10 requests content from EBAY.com, the mapping system 56 tells the mobile terminal 10 that web pages and their associated content (e.g. images, scripts, etc.) from EBAY.com are stored in the content cache 26 of the local cache 24.

The network node 18 receives a content request, such as a web page request, from the mobile terminal 10 (step 214) (see also step 102 of FIG. 3). From the request 214, the controller 22 determines that the mobile terminal desires content from the CDN 32. If the web page and its associated content are not already stored in the local cache 24, the web page and content are retrieved from content server 30 (step 216).

In one example, the CDN content is received into the local cache 24 after several requests to the web page in question are made by various users of the wireless communication network 42 of the network operator 90. Alternatively, the local cache 24 may receive certain amounts of CDN content at a specified time, irrespective of any specific content requests, under an agreement between the CDN operator 92 and the network operator 90.

The network node 18 analyzes the requested web page to determine one or more advertisement inventory objects 17 and their associated advertisement inventory object URLs (step 218) (see also step 104 of FIG. 3). The advertisement inventory object URL may be determined by the local cache 24 and sent to the controller 22 (step 218), or may alternatively be determined by the controller 22. The controller 22 sends an advertisement ID request to the advertisement server 28 that includes a network operator ID, the mobile terminal 10 device type, and a URL of the requested content in the local cache 24 (step 220) (see also step 106 of FIG. 3).

The advertisement server 28 (operated externally by either CDN operator 92 or an advertisement agency, for example) analyzes the received content URL, mobile terminal 10 device type, and network operator ID to determine an appropriate advertisement for the mobile terminal 10 (step 222). According to a predefined business relationship between the CDN operator 92 and the network operator 90, a portion of the advertisements delivered via the mobile communications network 42 will be network operator advertisements 16. The quantity and frequency of display of these ads may be determined by the predetermined business relationship (e.g. a quota may be employed).

The advertisement server 28 selects an advertisement based in part on the mobile terminal 10 device type. In one embodiment, the advertisement format may differ by device type. For example, mobile terminals 10 having larger screen sizes and higher resolution capabilities may be given higher resolution images, and mobile terminals 10 lacking video playback abilities may be given only image and not video advertisements. If a web browser on the mobile terminal 10 does not render web pages as a typical desktop browser, the advertisement server 28 may take this into account by sending an ID of a lower resolution or text-only advertisement, for example.

In the same or another embodiment, the advertisement content may differ depending on device type. For example, for a user having an older mobile terminal 10, the advertising server 28 may select an advertisement indicating cellular phone upgrade opportunities, whereas for a user having a newer mobile terminal 10, the advertising server 28 may select an advertisement indicating premium features only available on newer devices. Thus, the advertising server 28 may use the mobile terminal 10 device type to select advertisement format, advertisement content, or both.

Referring to FIG. 4b, and assuming the advertisement server 28 selects a network operator advertisement, the advertisement server 28 sends an advertisement ID of the selected advertisement to the controller 22 (step 224) (see also step 108 of FIG. 3). The controller 22 notifies the advertisement cache 24 that one of its stored advertisements, identified by the advertisement ID, has been requested (step 226). The network node 18 then maps the identified advertisement ID to a network operator advertisement 16 associated with the advertisement ID (i.e. a network operator advertisement in the local cache 24), and dynamically links the network operator advertisement 16 to the requested content 14 (step 228) (see also steps 110-112 of FIG. 3). That is, the network node 18 replaces the advertisement inventory object URL in the web page with the advertisement URL pointing to the identified network operator advertisement in the local cache 24. The network node 18 then transmits the web page containing a list of objects identified by URLs, including the newly inserted advertisement URL, to the mobile terminal 10 (step 230). The list of objects could include images, text, and scripts of the web page, for example.

The network node 18 receives individual HTTP GET requests for individual objects of the web page (e.g. ads, images, scripts, etc.) (step 232). Upon receiving a request specifically for the network operator advertisement, the network node 18 transmits the identified network operator advertisement (step 232n). Thus, steps 230-232 correspond to step 114 in FIG. 3. The completed web page including the network operator advertisement 16 is then displayed on the mobile terminal 10 (step 234).

Of course, it is possible that the advertisement server 28 will not always select a network operator advertisement. In this case, if the non-network operator advertisement is not already stored in the local cache 24, the non-network provider advertisement may be downloaded into the local cache 24 from the advertising server 28 in connection with step 224, for example. Additionally, although the network node 18 has been described as delivering a single network advertisement in step 114 (and call flow steps 230-232), it is understood that this is only an example, as the network node 18 may deliver multiple network operator advertisements 16, or may deliver a combination of network operator and non-network operator advertisements in connection with delivering the requested content 14.

Although CDN content has been described above as being delivered from the local cache 24, it is possible that the controller 22 initially deliver the requested CDN content directly from the content server 30 if the requested content is not already stored in the local cache 24. In one example, the controller 22 does not transmit advertisements during this initial delivery, and instead simply relays the requested CDN content to the mobile terminal 10 while also storing a copy of the requested content in the local cache 24 for future use. In another example, the controller 22 does transmit advertisements during this initial delivery, by only caching part of the CDN content (e.g. the webpage of step 216) and by delivering the remaining CDN content (e.g. the "associated content" of the webpage of step 216) directly from the content server 30 in steps 232a-n during the initial delivery. Subsequently though, once the requested content is stored in the local cache 24, steps 218-234 would be performed as described above.

The system 40 for delivering ads to the mobile terminal 10, that employs the method 100 of FIG. 3 and the signaling of FIG. 4, is mutually beneficial for both network operators 90 and CDN operators 92. The system 40 is beneficial for network operators 90 because the network operator 90 is able to cache significant amounts of advertisement and content in the local cache 24, and is able to minimize traffic through the core network 46 and specifically through the peering point 45, thus reducing undesired network bottlenecks. Additionally, the network operator 90 is able to display targeted ads to both its subscribers and also non-subscriber roaming users.

The system 40 is beneficial for CDN operators 92 because the CDN operators 92 are able to tightly integrate their services with those of a network operator 90, and the CDN operators 92 can leverage this integration by indicating to potential customers that they have servers within the core network of a network operator 90. A primary reason that content providers use CDNs is to increase the speed and reliability with which their content is delivered to end users. CDNs often include servers at various geographic locations throughout the world to minimize transmission distances between web servers and end users. By locating a cache within the core network 46 of a network operator, the CDN operator 92 would be able to further improve this efficiency as a competitive advantage.

In one example, the system 40 enables the CDN operator 92 to share revenue with the network operator 90 by giving the network operator 90 free advertising space in its CDN content delivery. Advantageously then, the network operator 90 may reduce expenditures on advertising.

Although the method 100 and associated signaling of call flow diagram 200 has been described in connection with delivering web page content, it is understood that this is only an example, and the method 100 could be applied to delivery of other items. For example, the mobile terminal 10 may request a non-CDN web page containing an embedded video hosted by the CDN 32. In this case, the web page and some of its elements could be provided from outside of the local cache 24, whereas the embedded video and an associated network operator video advertisement to be played before or after the video could be delivered from the local cache 24.

In one example the requested CDN content may not be a web page, but may instead be content requested by a mobile phone application, such as an application that views images or videos. If the mobile phone application was configured to include one or more advertising inventory object URLs, the method 100 would still be applicable.

Those of ordinary skill in the art will appreciate that the present invention is not limited to specific wireless communication networks. As non-limiting examples, the gateway 60 may be a Gateway GPRS Support Node (GGSN) within a 3G network, or may be a gateway within a Long Term Evolution (LTE) network.

Also, although only a single CDN 32 has been discussed in connection with the system 40, it is understood that the network node 18 may be configured to perform the method 100 with respect to a plurality of CDNs 32.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method for delivering network operator advertisements to a mobile terminal in association with providing requested content from a content delivery network, said method being implemented by one or more processing circuits in a network node within a core network of a wireless communication network supporting said mobile terminal, said method comprising:
   receiving by the one or more processing circuits a content request directed to locally-cached content from the content delivery network that is cached in the core network;
   determining by the one or more processing circuits that the requested content includes or is associated with an advertisement placeholder and in response thereto sending an advertisement identification (ID) request to an external advertisement server, said advertisement ID request including a network operator ID;
   receiving by the one or more processing circuits an advertisement ID from the advertisement server responsive to said advertisement ID request;
   mapping by the one or more processing circuits the advertisement ID to a network operator advertisement associated with said advertisement ID;
   dynamically linking by the one or more processing circuits the network operator advertisement to the requested content; and
   delivering by the one or more processing circuits the locally-cached requested content, including said network operator advertisement, to the mobile terminal;
   wherein the wireless communication network is different from the content delivery network.

2. The method of claim 1, wherein the locally-cached content is stored in a local cache that is associated with the network node and is located in the core network, and wherein the network node delivers the requested content and the dynamically linked network operator advertisement from the local cache.

3. The method of claim 2, wherein the requested content includes a web page, and wherein said dynamically linking the network operator advertisement to the requested content comprises updating a uniform resource locator (URL) of the advertisement placeholder to link to the network operator advertisement in the local cache.

4. The method of claim 1, wherein the requested content includes a web page referencing the advertisement placeholder and a plurality of additional objects, and wherein said delivering the requested content, including said network operator advertisement, to the mobile terminal comprises:
   transmitting by the one or more processing circuits the web page to the mobile terminal; and
   transmitting by the one or more processing circuits the network operator advertisement and the plurality of additional objects referenced by the web page to the mobile terminal in multiple transmissions, responsive to multiple corresponding requests received from the mobile terminal.

5. The method of claim 1, further comprising:
   determining by the one or more processing circuits a device type of the mobile terminal from a Type Allocation Code (TAC) of an International Mobile Equipment Identity (IMEI) known for the mobile terminal; and
   wherein said advertisement ID request includes the mobile terminal device type.

6. The method of claim 5, further comprising:
   receiving by the one or more processing circuits the IMEI from an entity in the wireless communication network.

7. The method of claim 5, wherein the delivered network operator advertisement is formatted for the mobile terminal device type.

8. The method of claim 5, wherein the delivered network operator advertisement is directed to network operator services applicable specifically to the mobile terminal device type.

9. A network node configured to deliver network operator advertisements to a mobile terminal in association with providing requested content from a content delivery network, said network operator advertisements and requested content being delivered via a wireless communication network supporting said mobile terminal, said network node residing in a core network of the wireless communication network, and comprising:

one or more communication interfaces for communicating with an external advertisement server included in said content delivery network; and a controller operatively associated with said one or more communication interfaces, and configured to:

receive a content request directed to content from the content delivery network that is cached in a local cache associated with the network node and located in the core network;

determine that the requested content includes or is associated with an advertisement placeholder and in response thereto to send an advertisement identification (ID) request to the advertisement server, said advertisement ID request including a network operator ID;

receive an advertisement ID from the advertisement server responsive to said advertisement ID request;

map the advertisement ID to a network operator advertisement associated with said advertisement ID;

dynamically link the network operator advertisement to the requested content; and deliver the locally-cached requested content, including the network operator advertisement, to the mobile terminal;

wherein the wireless communication network is different from the content delivery network.

10. The network node of claim 9, wherein the controller is further configured to cache a plurality of network operator advertisements in the local cache, and to deliver the requested content and the dynamically linked network operator advertisement from the local cache.

11. The network node of claim 10, wherein the requested content includes a web page, and wherein the controller is configured to dynamically link the network operator advertisement to the requested content by updating a uniform resource locator (URL) of the advertisement placeholder to link to the network operator advertisement in the local cache.

12. The network node of claim 9, wherein the requested content includes a web page referencing the advertisement placeholder and a plurality of additional objects, and wherein the controller is configured to deliver the requested content, including said network operator advertisement, to the mobile terminal by:

transmitting the web page to the mobile terminal; and transmitting the network operator advertisement and the plurality of additional objects referenced by the web page to the mobile terminal in multiple transmissions, responsive to multiple corresponding requests received from the mobile terminal.

13. The network node of claim 9, wherein the controller is further configured to determine a device type of the mobile terminal from a Type Allocation Code (TAC) of an International Mobile Equipment Identity (IMEI) known for the mobile terminal, and to include the mobile terminal device type in said advertisement ID request.

14. The network node of claim 13, wherein the controller is further configured to receive the IMEI from an entity in the wireless communication network.

15. The network node of claim 13, wherein the delivered network operator advertisement is formatted for the mobile terminal device type.

16. The network node of claim 13, wherein the delivered network operator advertisement is directed to network operator services applicable specifically to the mobile terminal device type.

* * * * *